(12) United States Patent
Hamamoto

(10) Patent No.: US 11,569,630 B2
(45) Date of Patent: Jan. 31, 2023

(54) LASER APPARATUS

(71) Applicant: MITSUBISHI HEAVY INDUSTRIES, LTD., Tokyo (JP)

(72) Inventor: Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/267,665

(22) PCT Filed: Nov. 20, 2019

(86) PCT No.: PCT/JP2019/045479
§ 371 (c)(1),
(2) Date: Feb. 10, 2021

(87) PCT Pub. No.: WO2020/174779
PCT Pub. Date: Sep. 3, 2020

(65) Prior Publication Data
US 2021/0203118 A1    Jul. 1, 2021

(30) Foreign Application Priority Data
Feb. 27, 2019  (JP) .............................. JP2019-033984

(51) Int. Cl.
*H01S 3/042*  (2006.01)
*H01S 3/04*   (2006.01)
(Continued)

(52) U.S. Cl.
CPC ............ *H01S 3/042* (2013.01); *H01S 3/0407* (2013.01); *H01S 3/0604* (2013.01);
(Continued)

(58) Field of Classification Search
CPC ...... H01S 3/042; H01S 3/0407; H01S 3/0604; H01S 3/0625; H01S 3/08072
See application file for complete search history.

(56) References Cited

U.S. PATENT DOCUMENTS 4,495,782 A * 1/1985 Salour .................... F17C 3/085
                                                        62/51.1
4,984,246 A * 1/1991 Cabaret ................... H01S 3/042
                                                         372/75
(Continued)

FOREIGN PATENT DOCUMENTS

DE    4433888 A1 * 3/1995 ............. B23K 26/06
DE    10005195      8/2001
(Continued)

OTHER PUBLICATIONS

English translation of the International Preliminary Report on Patentability dated Sep. 10, 2021 in International Application No. PCT/JP2019/045479.
(Continued)

*Primary Examiner* — Joshua King
(74) *Attorney, Agent, or Firm* — Wenderoth, Lind & Ponack, L.L.P.

(57) ABSTRACT

A laser apparatus that can generate a high-quality laser beam is provided. The laser apparatus is provided with a laser medium and an insulation layer. The laser medium has a first surface and a second surface. Incident laser light is incident on the first surface. The second surface totally reflects the incident laser light that is incident to the second surface at an incident angle equal to or larger than a critical angle. The insulation layer covers a second area of the second surface that surrounds a first area of the second surface, the first area totally reflecting the incident laser light. The laser medium is exposed in the first area.

8 Claims, 10 Drawing Sheets

(51) Int. Cl.
*H01S 3/06* (2006.01)
*H01S 3/094* (2006.01)
*H01S 3/16* (2006.01)
*H01S 3/08* (2006.01)

(52) U.S. Cl.
CPC .......... *H01S 3/0621* (2013.01); *H01S 3/0625* (2013.01); *H01S 3/08072* (2013.01); *H01S 3/094* (2013.01); *H01S 3/1643* (2013.01)

(56) References Cited

U.S. PATENT DOCUMENTS

| | | | | |
|---|---|---|---|---|
| 5,084,889 A | * | 1/1992 | Tajima | H01S 3/0604 372/71 |
| 5,299,213 A | * | 3/1994 | Kuba | H01S 3/042 372/34 |
| 5,351,251 A | * | 9/1994 | Hodgson | H01S 3/08 372/4 |
| 5,455,838 A | * | 10/1995 | Heritier | H01S 3/0941 372/75 |
| 5,479,430 A | * | 12/1995 | Shine, Jr. | H01S 3/0606 372/66 |
| 5,553,088 A | * | 9/1996 | Brauch | H01S 3/109 372/71 |
| 5,832,016 A | * | 11/1998 | Basu | H01S 3/094084 372/36 |
| 6,219,361 B1 | * | 4/2001 | Guch, Jr. | H01S 3/0627 372/66 |
| 6,658,036 B1 | * | 12/2003 | Carrig | H01S 3/042 372/66 |
| 6,873,639 B2 | * | 3/2005 | Zhang | H01S 3/109 372/92 |
| 7,085,304 B2 | * | 8/2006 | Vetrovec | H01S 3/0941 372/69 |
| 7,200,160 B2 | * | 4/2007 | Ludewigt | H01S 3/0627 372/66 |
| 7,356,062 B2 | * | 4/2008 | Brick | H01S 5/18352 372/49.01 |
| 7,535,633 B2 | * | 5/2009 | Franjic | H01S 3/0632 359/344 |
| 7,609,741 B2 | * | 10/2009 | Vetrovec | H01S 3/0612 372/67 |
| 8,068,523 B2 | | 11/2011 | Takeshita et al. | |
| 8,259,763 B2 | | 9/2012 | Takeshita et al. | |
| 9,806,484 B2 | * | 10/2017 | Xiao | H01S 3/08059 |
| 2002/0075934 A1 | | 6/2002 | Ludewigt et al. | |
| 2002/0110162 A1 | * | 8/2002 | Ludewigt | H01S 3/0604 372/39 |
| 2002/0126373 A1 | * | 9/2002 | Huonker | H01S 3/0604 359/342 |
| 2003/0025987 A1 | | 2/2003 | Erhard et al. | |
| 2005/0094689 A1 | | 5/2005 | Ludewigt | |
| 2005/0249258 A1 | * | 11/2005 | Rothenberg | H01S 3/2333 372/70 |
| 2006/0114961 A1 | * | 6/2006 | Manni | H01S 3/0606 372/75 |
| 2006/0165141 A1 | * | 7/2006 | Kopf | H01S 3/0941 372/36 |
| 2007/0238219 A1 | * | 10/2007 | Bennett | H01S 3/042 438/106 |
| 2007/0248137 A1 | * | 10/2007 | Basu | G02F 1/3501 372/67 |
| 2007/0297469 A1 | * | 12/2007 | Brown | H01S 3/042 372/36 |
| 2008/0089372 A1 | * | 4/2008 | Izawa | H01S 3/042 372/36 |
| 2012/0008654 A1 | * | 1/2012 | Takeshita | H01S 3/07 372/34 |
| 2012/0250719 A1 | * | 10/2012 | Hodgson | H01S 3/0604 372/70 |
| 2012/0320937 A1 | * | 12/2012 | Branly | H01S 3/0604 372/35 |
| 2013/0301662 A1 | * | 11/2013 | Stuart | H01L 31/024 372/5 |
| 2015/0096722 A1 | | 4/2015 | Zweiback et al. | |
| 2015/0331209 A1 | * | 11/2015 | Pikulski | H01S 3/042 427/163.2 |
| 2018/0083408 A1 | * | 3/2018 | Matsuda | H01S 3/1643 |
| 2018/0106669 A1 | * | 4/2018 | Bae | H01S 3/042 |
| 2018/0145474 A1 | * | 5/2018 | Kondo | H01S 3/063 |
| 2019/0356105 A1 | * | 11/2019 | Ueda | H01S 3/0407 |

FOREIGN PATENT DOCUMENTS

| | | | | |
|---|---|---|---|---|
| DE | 10360763 A1 | * | 7/2005 | .......... H01S 3/0621 |
| DE | 102016205638 A1 | * | 10/2017 | ........ H01L 23/4735 |
| DE | 102016108474 A1 | * | 11/2017 | .......... H01S 3/0604 |
| EP | 0632551 A1 | * | 1/1994 | |
| EP | 0 632 551 | | 1/1995 | |
| EP | 1178579 A2 | * | 2/2002 | ............. H01S 3/042 |
| EP | 3416251 A1 | * | 12/2018 | .......... H01S 3/0405 |
| JP | 05-152646 | | 6/1993 | |
| JP | 2003-502850 | | 1/2003 | |
| JP | 2005-524245 | | 8/2005 | |
| JP | 2008004752 A | * | 1/2008 | |
| JP | 2010114162 A | * | 5/2010 | .......... H01S 3/0604 |
| JP | 2010-161304 | | 7/2010 | |
| JP | 5330801 | | 10/2013 | |
| JP | 2015-515124 | | 5/2015 | |
| JP | 2015-167216 | | 9/2015 | |
| JP | 2017-022351 | | 1/2017 | |
| JP | 2017022351 A | * | 1/2017 | |
| JP | 2017-076751 | | 4/2017 | |
| JP | 2017157647 A | * | 9/2017 | ............. H01S 3/027 |
| JP | 2018129391 A | * | 8/2018 | ............... H01S 3/04 |
| WO | WO-2005069454 A1 | * | 7/2005 | .......... H01S 3/0604 |
| WO | 2005/091447 | | 9/2005 | |
| WO | WO2005091446 A1 | * | 2/2008 | |
| WO | WO-2010013546 A1 | * | 2/2010 | .......... H01S 3/0606 |
| WO | 2015/018722 | | 2/2015 | |
| WO | WO-2015018722 A1 | * | 2/2015 | .......... H01S 3/0405 |
| WO | WO-2016151892 A1 | * | 9/2016 | ............. H01S 3/027 |
| WO | WO-2017149944 A1 | * | 9/2017 | ............. H01S 3/027 |
| WO | 2018/147231 | | 8/2018 | |

OTHER PUBLICATIONS

International Search Report dated Feb. 4, 2020 in International Application No. PCT/JP2019/045479.
Ken-ichi Ueda, "New Concepts for Thermal-lens-free Solid State Lasers Athermal Laser Materials and Heat Capacitive Active Mirror", Toyota Research Report, May 29, 2017, vol. 70, pp. 109-120, with English abstract.
Extended European Search Report dated Aug. 5, 2021 in European Patent Application No. 19917092.9.
Furuse, Hiroaki et al., "Total-reflection active-mirror laser with cryogenic Yb: YAG ceramics", Optics Letters, Optical Society of America, US, Nov. 1, 2009, vol. 34, No. 21, pp. 3439-3441.
Mudge D. et al., "Power Scalable $TEM_{00}$ CW Nd:YAG Laser with Thermal Lens Compensation", IEEE Journal of Selected Topics in Quantum Electronics, Jul. 2000, vol. 6, No. 4, pp. 643-649.

* cited by examiner

LASER APPARATUS

TECHNICAL FIELD

The present invention relates to a laser apparatus and can be suitably used, for example, for a laser apparatus that amplifies and emits laser light incident from outside.

BACKGROUND ART

High-quality laser beams are required in technical fields of laser machining, long-distance laser propagation and the like. By using laser light with higher beam quality, the laser light can be focused on a smaller aperture and a spread of beam during propagation can be reduced.

As a challenge for generating a high-quality laser beam, there is wavefront distortion due to heat generated in a laser medium. Due to influence of heat in the laser medium, the wavefront of the laser beam is distorted and a quality of the laser beam deteriorates. As a result, the focus diameter of the laser beam becomes larger and the spread of the beam during propagation becomes larger. Furthermore, when a relatively large wavefront distortion occurs, the laser beam may be focused on an optical device and the optical may be damaged. From such a point of view, it is known that an influence due to heat distribution inside a laser medium to a wavefront distortion of a laser beam can be reduced by bringing the heat distribution inside the laser medium closer to one-dimensional distribution.

On the other hand, as a method of efficiently cooling a laser medium used to generate a high-power laser beam, a technology of injecting a jet so as to directly hit a surface of the laser medium is known. However, it is difficult to precisely control an in-plane cooling capacity of cooling by jet and therefore it is also difficult to bring the heat distribution inside the laser medium closer to the one-dimensional distribution.

In relation to the above, Non-Patent Literature 1 (Ken-ichi UEDA, "New Concepts for Thermal-lens-free Solid State Lasers Athermal Laser Materials and Heat Capacitive Active Mirror", Toyota Research Report, issued on May 29, 2017, Vol. 70, pp. 109 to 120) discloses a method of reducing wavefront distortion. In the Non-Patent Literature 1, a heat distribution of a laser medium is brought closer to one-dimensional distribution by cooling only a part of the laser medium or heating a side surface of the laser medium.

CITED LIST

Patent Literature

[Patent Literature 1] German Patent Application Publication No. 1000519 A1
[Patent Literature 2] Japanese Patent No. 5330801 B2
[Patent Literature 3] Japanese Patent Publication No. 2015-515124 A
[Patent Literature 4] Japanese Patent Publication No. 2017-076751 A
[Non-Patent Literature]
[Non-Patent Literature 1] Ken-ichi UEDA, "New Concepts for Thermal-lens-free Solid State Lasers Athermal Laser Materials and Heat Capacitive Active Mirror", Toyota Research Report, issued on May 29, 2017, Vol. 70, pp. 109 to 120.

SUMMARY OF INVENTION

A laser apparatus able to generate a high-quality laser beam will be provided. Other problems and novel features will become apparent from disclosures of the present description and accompanying drawings.

According to an embodiment, a laser apparatus is provided with a laser medium and an insulation layer. The laser medium has a first surface and a second surface. Incident laser light is incident to the first surface. The second surface totally reflects the incident laser light that is incident to the second surface at an incident angle that is equal to or larger than a critical angle. The insulation layer covers a second area of the second surface that surrounds a first area of the second surface, the first area totally reflecting the incident laser light. The laser medium is exposed in the first area.

According to the above-described embodiment, a high-quality laser beam can be generated.

DESCRIPTION OF EMBODIMENTS

Embodiments of a laser apparatus according to the present invention will be described below by referring to attached diagrams.

First Embodiment

A configuration example of a laser apparatus 1 according to an embodiment will be described with reference to FIG.

Figure 1:
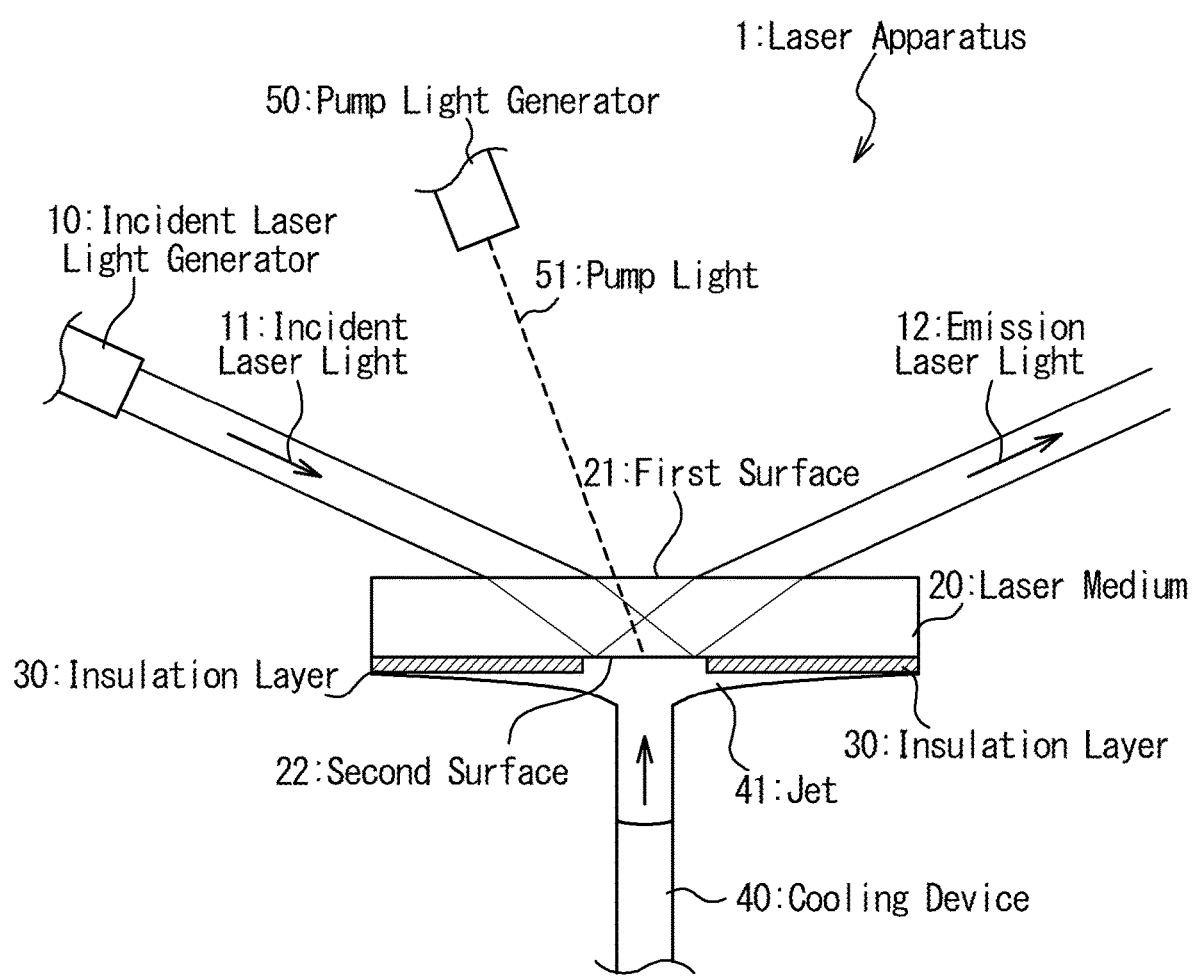
FIG. 1 is a diagram that shows a configuration example of a laser apparatus according to an embodiment.

1. FIG. 1 is a diagram that shows a configuration example of a laser apparatus 1 according to an embodiment.

The laser apparatus 1 in FIG. 1 is provided with an incident laser light generator 10, a laser medium 20, an insulation layer 30, a cooling device 40 and a pump light generator 50.

The incident laser light generator 10 generates incident laser light 11. The pump light generator 50 generates pump light 51. The laser medium 20 has a first surface 21 and a second surface 22 that faces the first surface 21. The laser medium 20 generates emission laser light 12 by receiving the pump light 51 from the first surface 21 and amplifying the incident laser light 11 that passes through the laser medium 20. At that time, the incident laser light 11 is incident to the first surface 21, totally reflected by the second surface 22 and emitted from the first surface 21. The incident laser light 11 after being emitted from the first surface 21 of the laser medium 20 will be referred to as the emission laser light 12, for convenience. In other words, the laser apparatus 1 is configured to generate the emission laser light 12.

The cooling device 40 cools a part of the second surface 22 of the laser medium 20 by injecting a jet 41 so as to directly hit the part of the second surface 22. At least a part of a remaining part of the second surface 22 of the laser medium 20 is covered by the insulation layer 30 and is not directly hit by the jet 41. As the refrigerant used in the jet 41, water, antifreeze, fluorinert, liquid nitrogen and the like are used as examples.

The insulation layer 30 may be, for example, a high reflective coating that increases a reflectance of the second surface 22 of the laser medium 20. Herein, the high reflective coating is also referred to as a High Reflection (HR) coating and may be configured by alternatively laminating first films with lower refractive index and second films with higher refractive index, each of which having a thickness of a quarter of a wavelength of the incident laser light 11, for example. As an example, when the wavelength of the incident laser light 11 is equal to 1 μm (micrometer) and a lamination number of the high reflective coating is 21, the film thickness of the high reflective coating is 5.25 μm. If the thickness of the insulation layer 30 is on this order, an influence on a flow of the jet 41 is so small that it is practically negligible and therefore an influence to a coiling performance, due to stagnation of the jet 41 at an end of the insulation layer 30, is also practically negligible.

In addition, for example, the insulation layer 30 may be an anti-reflection coating that increase a transmittance of the second surface 22 of the laser medium 20. Herein, the anti-reflection coating is also referred to as an Anti-Reflection (AR) coating and may be configured with a dielectric film or the like having a refraction index lower than the refraction index of the laser medium 20 and a thickness of a quarter of the wavelength of the incident laser light 11, for example. As an example, when the wavelength of the incident laser light 11 is equal to 1 μm, the film thickness of the anti-reflection coating is 0.25 μm and an influence on the flow of the jet 41 and the performance of cooling the laser medium 20 is practically negligible. It should be noted that in the calculations of film thicknesses in the previous paragraph and the present paragraph an incident angle θ is set to 0 degree and the refraction index of film material is set to 1 (no absorption) for simplification, and actual thicknesses are appropriately corrected in consideration of the above.

In general, a thermal conductivity of the high reflective coating and a thermal conductivity of the anti-reflection coating are significantly lower than a thermal conductivity of the laser medium 20. As an example, a thermal conductivity of $Ta_2O_5$ (Tantalum pentoxide) used in apart of the high reflective coating is approximatively 0.20 W/(m·K), a thermal conductivity of $MgF_2$ (magnesium fluoride) used in a part of an anti-reflection coating is approximatively 0.3 W/(m·K) at a temperature of 27 degrees Celsius, and a thermal conductivity of YAG (Yttrium Aluminum Garnet) used in a part of the laser medium 20 is approximatively 11.7 W/(m·K)

Furthermore, a technology for forming the high reflective coating and the anti-reflection coating on a surface of the laser medium 20 is established. In addition, a technology of forming the high reflective coating and/or anti-reflection coating in a desired shape, by methods of masking, etching, laser pulse deposition and the like, is known.

As described above, the high reflective coating and the anti-reflection coating are suitable to be used as the insulation layer 30 to be provided on the second surface 22 of the laser medium 20. However, it is to be noted that the insulation layer 30, that is originally formed of the high reflective coating for reflecting the incident laser light 11 or the anti-reflection coating for not reflecting the incident laser light 11, does not exists in the area of the second surface 22 of the laser medium 20 where the incident laser light 11 reaches and is totally reflected and exists only in the area of the second surface 22 of the laser medium 20 where the incident laser light 11 does not reach on the contrary. This will be explained in the following.

Figure 2A:
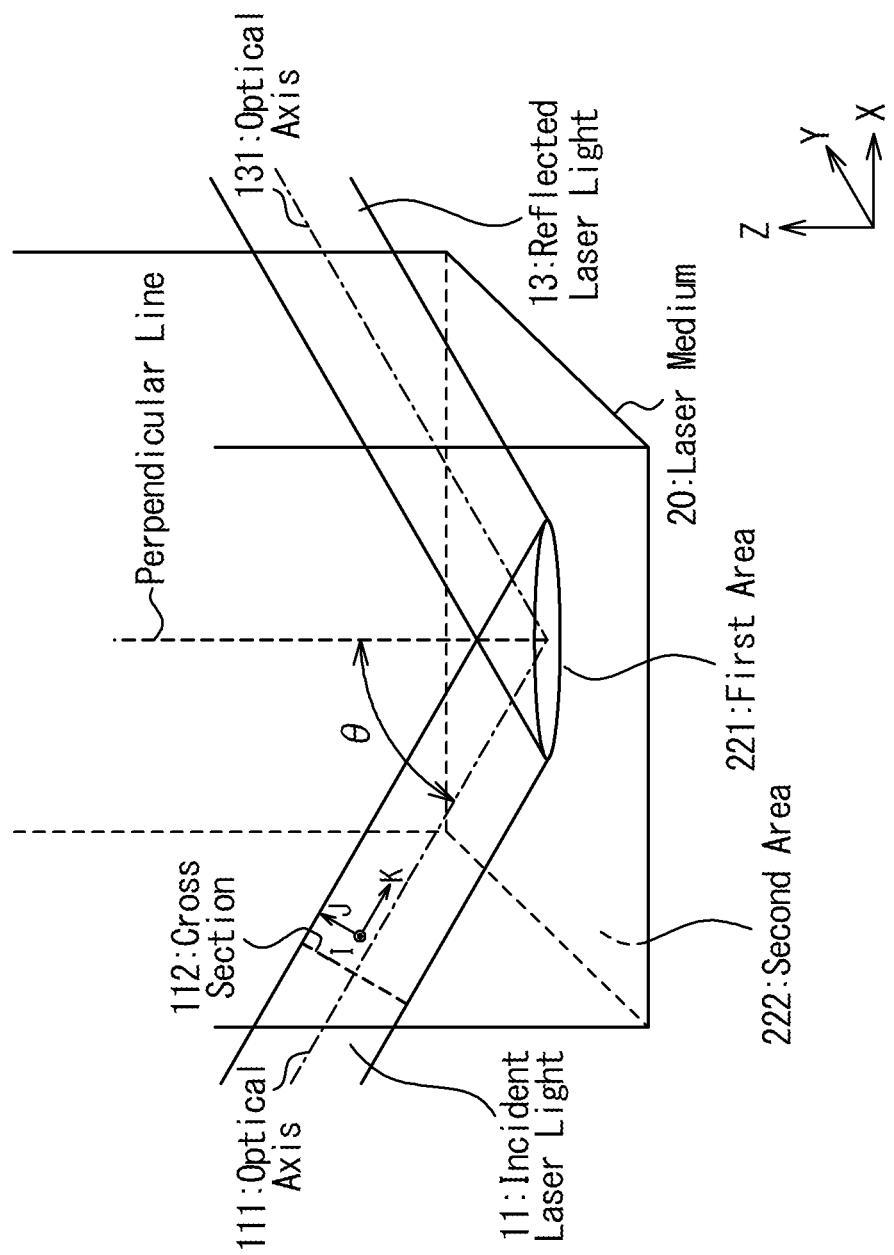
FIG. 2A is a schematic bird's eye view that shows an example of a shape of incident laser light according to an embodiment.
Figure 2B:
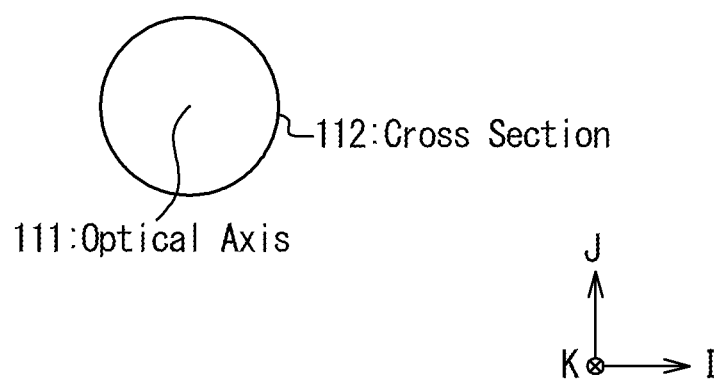
FIG. 2B is a schematic cross-sectional view that shows the example of the shape of the incident laser light in FIG. 2A.
Figure 2C:
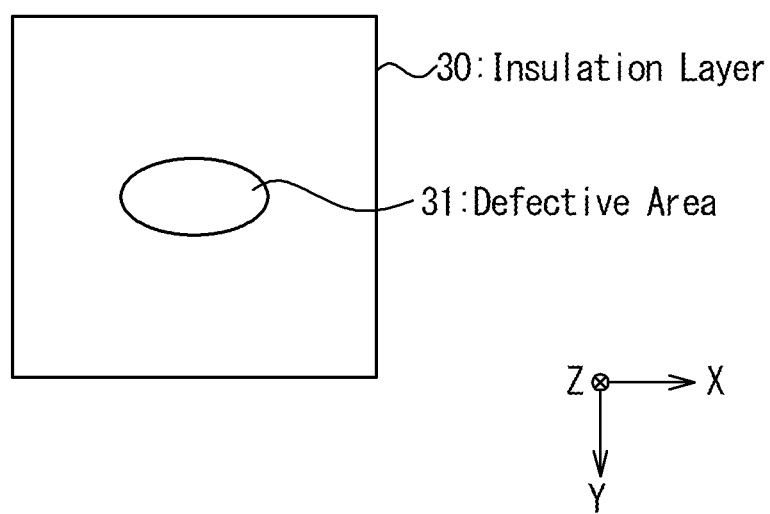
FIG. 2C is a diagram that shows an example of a shape of an insulation layer that corresponds to the incident laser light in FIG. 2A.

With reference to FIGS. 2A, 2B and 2C, an example of shapes of the incident laser light 11 and the insulation layer 30 according to an embodiment will be described. FIG. 2A is a schematic bird's eye view that shows an example of a shape of incident laser light 11 according to an embodiment. FIG. 2B is a schematic cross-sectional view that shows the example of the shape of the incident laser light 11 in FIG. 2A. FIG. 2C is a diagram that shows an example of a shape of an insulation layer 30 that corresponds to the incident laser light 11 in FIG. 2A.

FIG. 2A shows the laser medium 20 and the incident laser light 11, extracted from the laser apparatus 1 shown in FIG. 1, in a state in which the incident laser light 11 is totally reflected on the second surface 22 of the laser medium 20. In FIG. 2A, the incident laser light 11 from the total reflection to the emission from the laser medium 20 will be referred to as reflected laser light 13, for convenience, to distinguish from the emission laser light 12 after the emission from the laser medium 20.

An angle between an optical axis 111 of the incident laser light 11 before the total reflection, that travels inside the laser medium 20 toward the second surface 22, and the perpendicular line of the second surface 22, will be referred to as incident angle θ. Although the incident angle θ is 60 degrees in the example of FIG. 2A, this is merely an example and the present embodiment is not limited by this value. When this incident angle θ is larger than a predetermined critical angle, the incident laser light is totally reflected at the second surface 22. It should be noted that this critical angle is determined based on the refraction index of the laser medium 20 and the refraction index of the fluid of which the jet 41 is consisted.

In the example of FIG. 2B, the shape of the cross section 112 of the incident laser light 11 is a true circle. Herein, the cross section 112 of the incident laser light 11 is a plane where a plane IJ, that is orthogonal to the optical axis 111 of the incident laser light 11 parallel to an axis K in a cartesian coordinate system IJK, and the incident laser light 11 having a predetermined thickness, cross.

An area of the second surface 22, where the incident laser light 11 is totally reflected, will be referred to as a first area 221. In addition, an area of the second surface 22, that surrounds the first area 221, will be referred to as a second area 222. The insulation layer 30 is configured to cover only this second area 222 and does not cover the first area 221 on the contrary. In other words, the insulation layer 30 has a defective area 31 with a same shape as the first area 221 at a same location as the first area 221. In further other words, the first area 221 of the second surface 22 of the laser medium 20 is exposed. It should be noted that the second area 222 may be all area of the second surface 22 except the first area 221, as shown in FIG. 1 and the like. However, in fact, the insulation layer 30 may be omitted at a part of the laser medium 20 far enough away from a peripheral part of the first area 221 heated by the pump light 51. This is because an influence of the cooling by the jet 41 given to the heat distribution inside the laser medium 20 is small enough in a part far enough away from the peripheral part of the first area 221 and a contribution to the wavefront of the emission laser light 12 is also small enough.

In the example of FIG. 2C, the shape of the defective area 31 of the insulation layer 30 is an ellipse with an aspect ratio of 1:2. This shape is determined based on the cross-sectional shape and the incident angle θ of the incident laser light 11. In other words, the shape of the defective area 31 shown in FIG. 2C is merely an example and does not limit the present embodiment.

Figure 3:
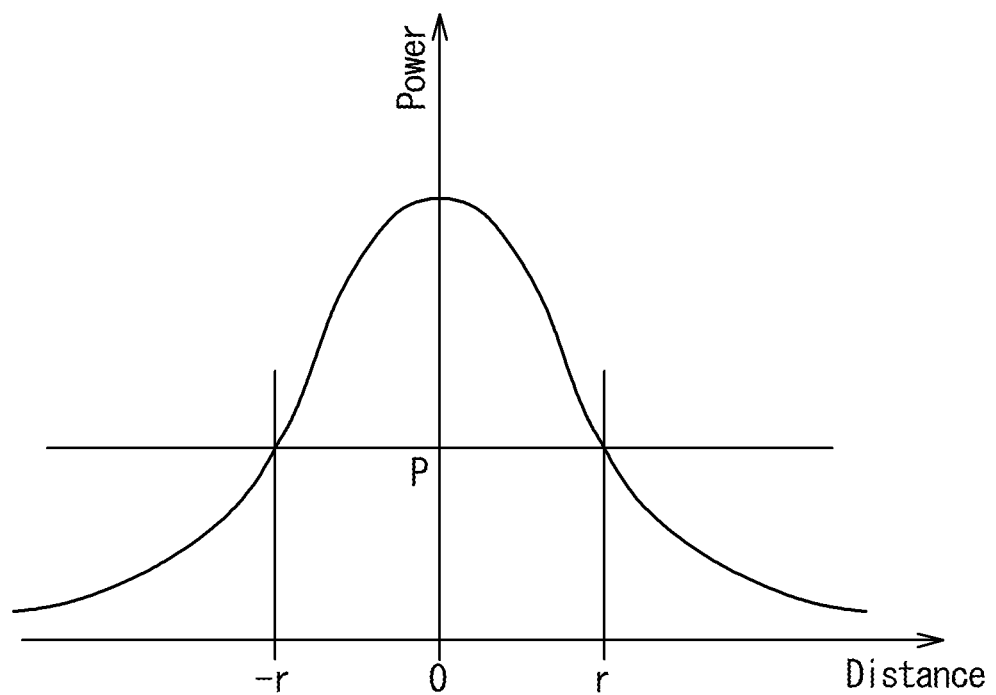
FIG. 3 is a graph that shows an example of a power distribution in a radius direction of the incident laser light according to an embodiment.

A relationship between a boundary of the incident laser light 11 and the shape of the defective area 31 of the insulation layer 30 will be described with reference to FIG. 3. FIG. 3 is a graph that shows an example of a power distribution in a radius direction of the incident laser light 11 according to an embodiment. In the graph in FIG. 3, the horizontal axis shows a distance from the optical axis 111 of the incident laser light 11 and the vertical axis shows a power of the incident laser light 11.

As shown in FIG. 3, the power of the incident laser light 11 is distributed so as to be smaller as the distance from the optical axis 111 is greater. This distribution is, for example, a normal distribution. In such a case, the boundary of the incident laser light 11 may be defined, for example, as below. That is, a predetermined threshold value P is set to the power of the incident laser light 11 and a location of the incident laser light 11 where the power is equal to this threshold value P is a boundary of the incident laser light 11. In other words, only a portion of the incident laser light 11 of which the power is equal to or greater than this threshold value P is treated as the incident laser light 11 and a part of which the power is less than this threshold value P is ignored. In the example of FIGS. 2B and 3, the shape of the cross section 112 of the incident laser light 11 is a true circle having a radius r.

The shape of the defective area 31 of the insulation layer 30 may be determined based on the boundary of the incident laser light 11 defined as above. That is, a part of the second surface 22 of the laser medium 20, where the incident laser light 11 inside the boundary defined as described above is irradiated and totally reflected, may be defined as the first area 221. An area of the second surface 22 of the laser medium 20 that surround this first area 221 may be defined as the second area 222. At that time, the shape of the defective area 31 of the insulation layer 30 may be determined so that the insulation layer 30 covers only the second area 222 and the first area 221 is exposed.

From a similar point of view, a material that constitutes the insulation layer 30 may be determined. In other words, generating the insulation layer 30 with which of the high reflective coating or the anti-reflection coating may be determined from a point of view of the power of the emission laser light 12. That is, when the power of the emission laser light 12 is prioritized over the quality thereof, by generating the insulation layer 30 with the high reflective coating, not only the part of the incident laser light 11 inside the radius r shown in FIG. 3 but also a component outside thereof can be totally reflected. On the contrary, when the quality of the emission laser light 12 is prioritized over the power thereof, by generating the insulation layer 30 with the anti-reflection coating, only a component of the incident laser light 11 inside the radius r shown in FIG. 3 can be totally reflected. It should be noted that, by adopting an appropriated film configuration, intermediate characteristics between the high reflective coating and the anti-reflection coating may be realized.

The inventor has found that the heat distribution inside the laser medium 20 can be brought closer to one dimensional distribution in the thickness direction (Z direction in FIG. 2A) of the laser medium 20 by injecting the jet 41 toward the second surface 22 of the laser medium 20 on which such an insulation layer 30 is formed and selectively cool the first area 221 where the incident laser light 11 is totally reflected. It should be noted that the high reflective coating or the anti-reflection coating used as the insulation layer 30 may be configured with a porous structure for example to prioritize heat insulation performance thereof, since respective original optical characteristics thereof are unnecessary.

Figure 4A:
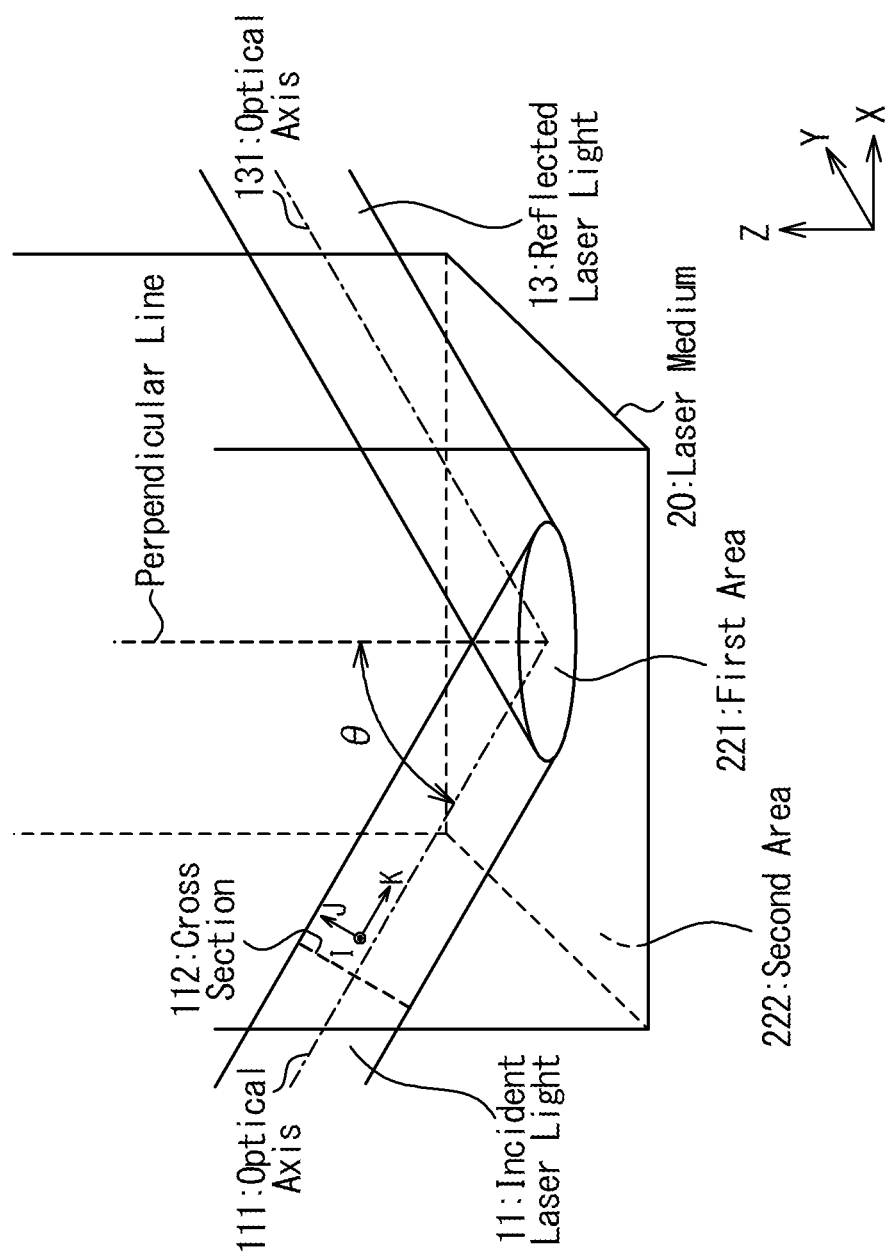
FIG. 4A is a schematic bird's eye view that shows another example of the shape of the incident laser light according to an embodiment.
Figure 4B:
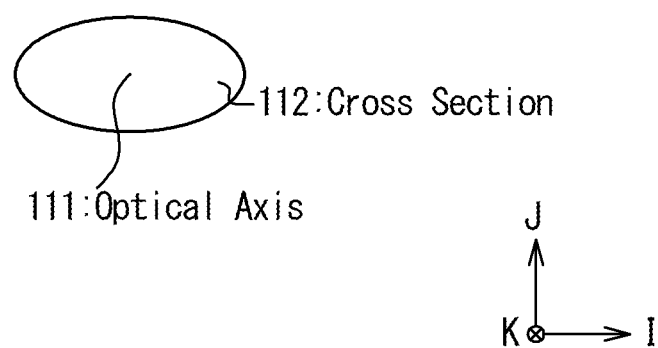
FIG. 4B is a schematic cross-sectional view that shows the other example of the shape of the incident laser light in FIG. 4A.
Figure 4C:
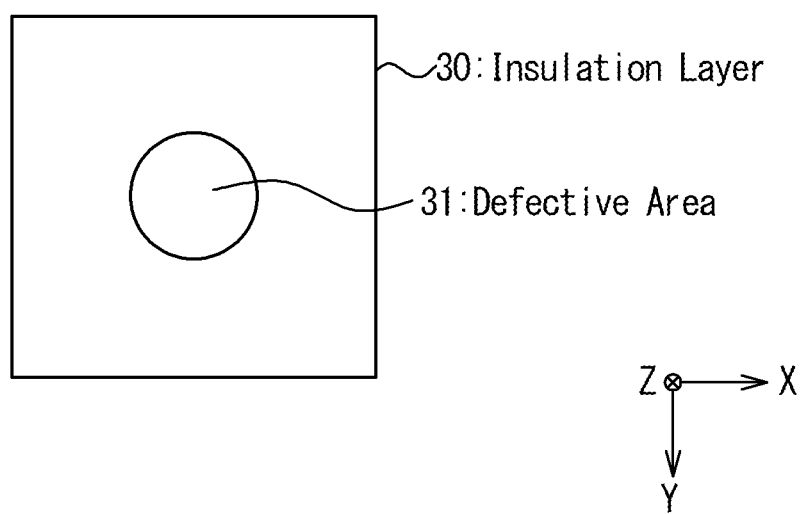
FIG. 4C is a diagram that shows another example of a shape of an insulation layer that corresponds to the incident laser light in FIG. 4A.

Another example of the shapes of the incident laser light 11 and the insulation layer 30 according an embodiment will be described with reference to FIGS. 4A, 4B and 4C. FIG. 4A is a schematic bird's eye view that shows another example of the shape of the incident laser light 11 according to an embodiment. FIG. 4B is a schematic cross-sectional view that shows the other example of the shape of the incident laser light 11 in FIG. 4A. FIG. 4C is a diagram that shows another example of a shape of an insulation layer 30 that corresponds to the incident laser light 11 in FIG. 4A.

FIG. 4A is equivalent to FIG. 2A added with following modifications. That is, the shapes of the incident laser light 11 and the shapes of the first area 221 are different. As shown in FIG. 4B, the shape of the cross section 112 of the incident laser light 11 is an ellipse with an aspect ratio of 1:2. As shown in FIG. 4C, the shape of the defective area 31 of the insulation layer 30 is a true circle.

Figure 5A:
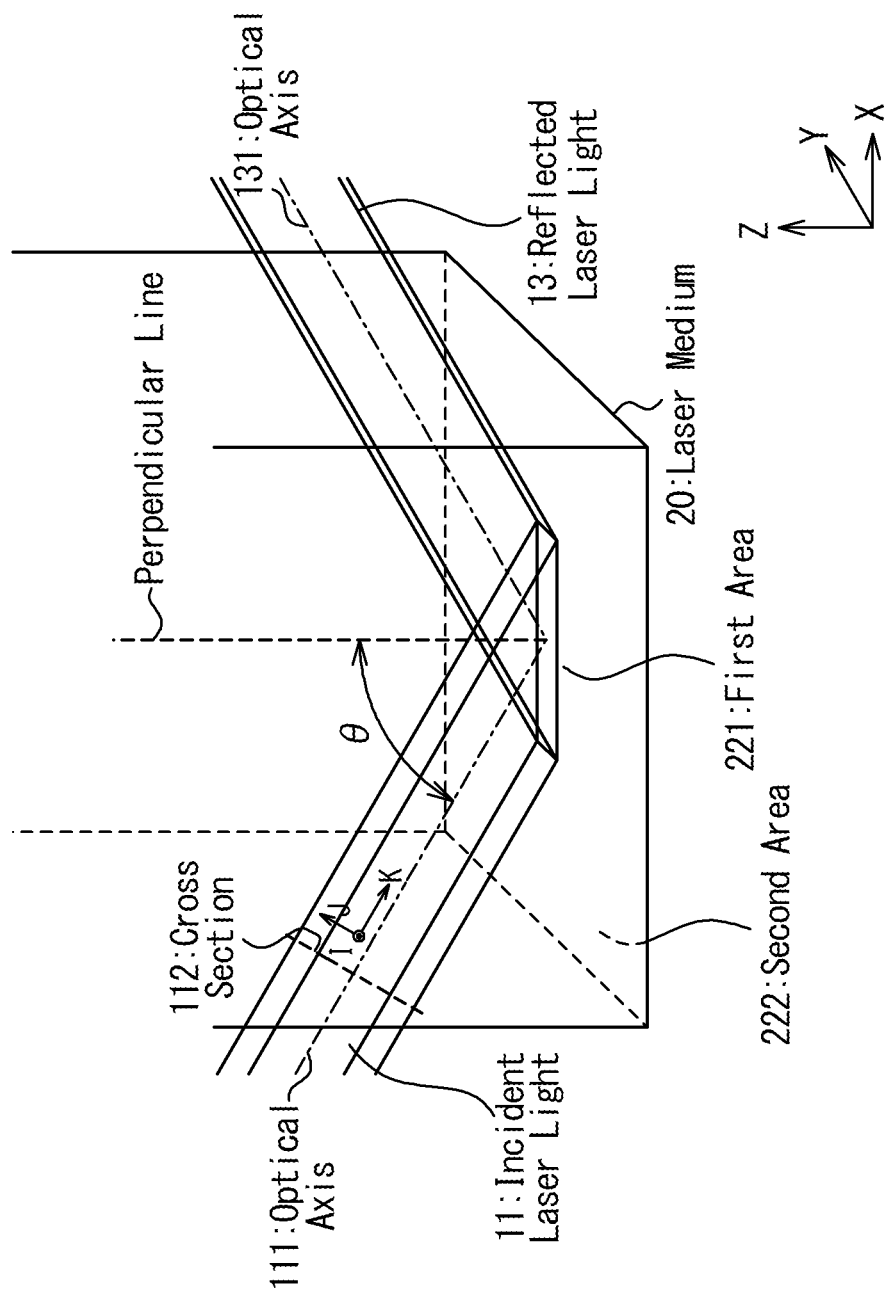
FIG. 5A is a schematic bird's eye view that shows a further other example of the shape of the incident laser light according to an embodiment.
Figure 5B:
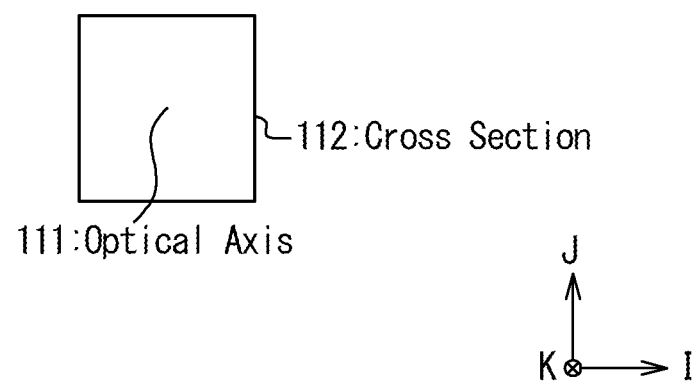
FIG. 5B is a schematic cross-sectional view of the further other example of the shape of the incident laser light in FIG. 5A.
Figure 5C:
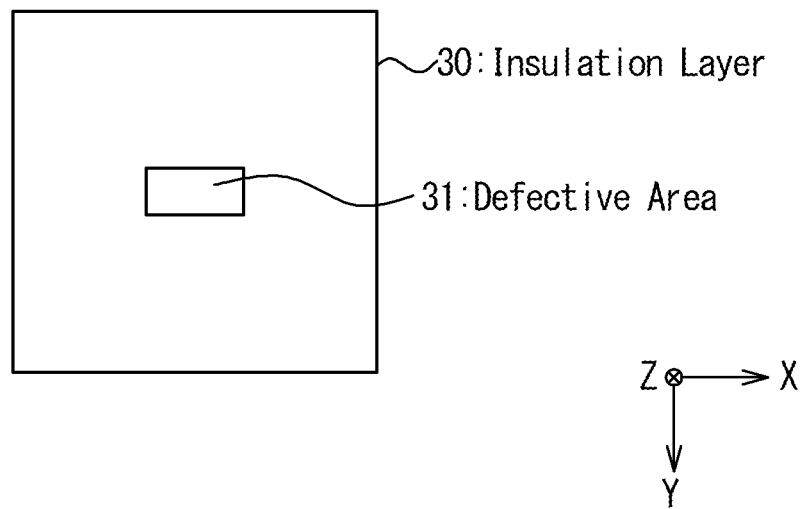
FIG. 5C is a diagram that shows a further other example of an insulation layer that corresponds to the incident laser light in FIG. 5A.

A further other example of the shapes of the incident laser light 11 and the insulation layer 30 according to an embodiment will be described with reference to FIGS. 5A, 5B and 5C. FIG. 5A is a schematic bird's eye view that shows a further other example of the shape of the incident laser light 11 according to an embodiment. FIG. 5B is a schematic cross-sectional view of the further other example of the shape of the incident laser light 11 in FIG. 5A. FIG. 5C is a diagram that shows a further other example of an insulation layer 30 that corresponds to the incident laser light 11 in FIG. 5A.

FIG. 5A is equivalent to FIG. 2A added with following modifications. That is, the shapes of the incident laser light 11 and the shapes of the first area 221 are different. The shape of the cross section 112 of the incident laser light 11 is, as shown in FIG. 5B, a square. The first area 221 has a same shape as the defective area 31 of the insulation layer 30 and the shape of the defective area 31 of the insulation layer 30 is, as shown in FIG. 5C, a rectangle with an aspect ration of 1:2. In this case, the emission laser light 12 also has a square cross section. By bundling a plurality of beams of emission laser light 12 each having a same square cross section, generation of a beam of laser light having a larger cross section becomes easier.

Figure 6:
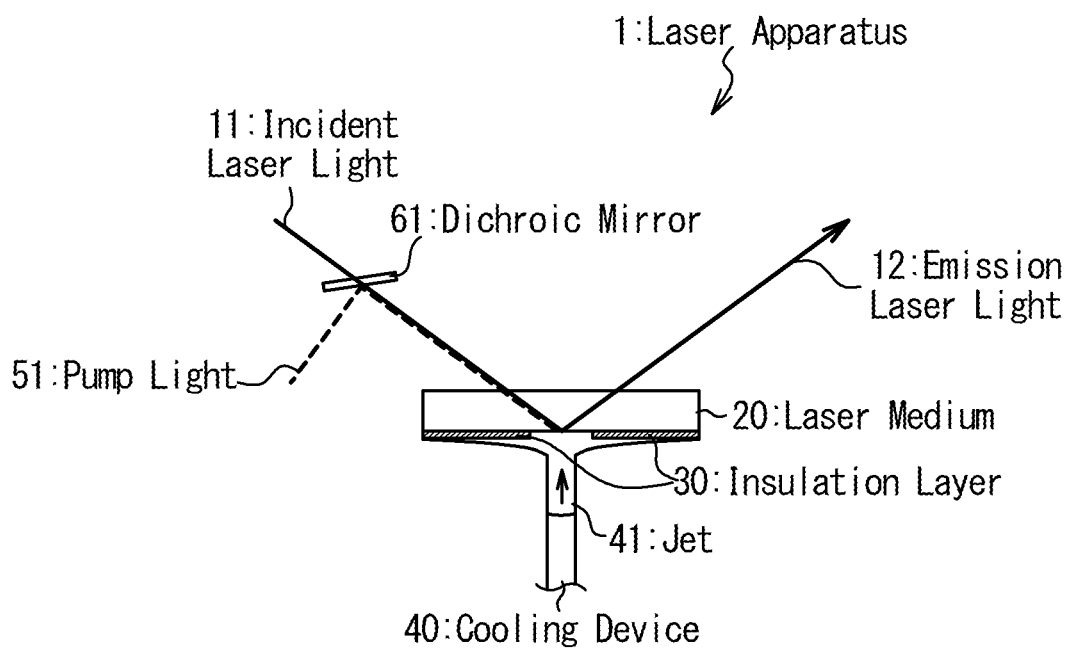
FIG. 6 is a diagram that shows a configuration example of a laser apparatus according to an embodiment.

A method of arranging the optical axis of the pump light 51 will be described with reference to FIG. 6. FIG. 6 is a diagram that shows a configuration example of a laser apparatus 1 according to an embodiment.

FIG. 6 is equivalent to FIG. 1 with a partial simplification, an addition of a dichroic mirror 61 and a modification of the arrangement of the pump light generator 50.

The dichroic mirror 61 is an optical device that reflects light having a predetermined wavelength and transmits light having other wavelengths. In the example of FIG. 6, the pump light 51 has a wavelength different from the incident laser light 11, and the dichroic mirror 61 reflects the pump light 51 while transmitting the incident laser light 11. It should be noted that a dichroic mirror 61 with characteristics of reflecting the incident laser light 11 while transmitting the pump light 51 may be selected.

By arranging the pump light generator 50 and the dichroic mirror 61 as in FIG. 6, the pump light 51 shares the optical axis with the incident laser light 11 from reflection at the dichroic mirror 61 to incidence into the laser medium 20. By doing so, a distance which the pump light 51 travels inside the laser medium 20 becomes longer than in the case of FIG. 1 and therefore a ratio of the energy of the pump light 51 absorbed by the laser medium 20 is improved.

As described above, the laser apparatus 1 according to the present embodiment can bring the heat distribution inside the laser medium 20 closer to one dimensional distribution by strongly cooling the first area 221 of the laser medium 20 with the jet 41 and insulating the second area 222 by use of the insulation layer 30, and can generate a high-quality laser beam.

Second Embodiment

Figure 7:
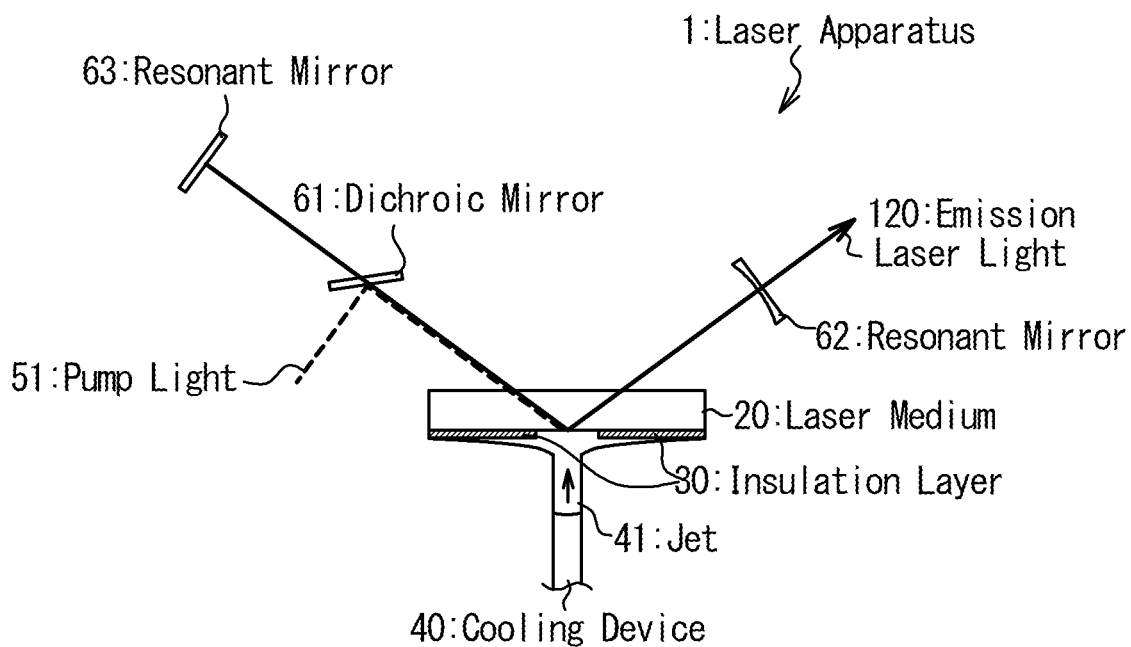
FIG. 7 is a diagram that shows a configuration example of a laser apparatus according to an embodiment.

It will be described that a laser oscillation can be realized as an application of the laser apparatus 1 according to the first embodiment, with reference to FIG. 7. FIG. 7 is a diagram that shows a configuration example of a laser apparatus 1 according to an embodiment.

The laser apparatus 1 in FIG. 7 operates as a laser oscillator by adding following modifications to the laser apparatus 1 shown in FIG. 6. That is, a resonant mirror 63 is added so that a reflection surface thereof orthogonally crosses the optical axis of the incident laser light 11 shown in FIG. 6 and a resonant mirror 62 is added so that a reflection surface thereof orthogonally crosses the optical axis of the emission laser light 12 shown in FIG. 6 as well.

Laser light reflected by the resonant mirror 62 and the resonant mirror 63 passes through an optical path so as to totally reflect at the first area 221 of the second surface 22 of the laser medium 20. A reflectance of the resonant mirror 63 may be higher than a reflectance of the resonant mirror 62. The pump light 51 passes through an optical path same as the optical path of the laser light between the resonant mirror 63 and the first area 221 of the second surface 22 of the laser medium 20, via the dichroic mirror 61, and is incident to the laser medium 20. By doing so, a laser oscillation is carried out between the resonant mirrors 62 and 63 in the laser apparatus 1 in FIG. 7, and emission laser light 120 of which power has reached a predetermined threshold value is outputted from the resonant mirror 62.

Figure 8:
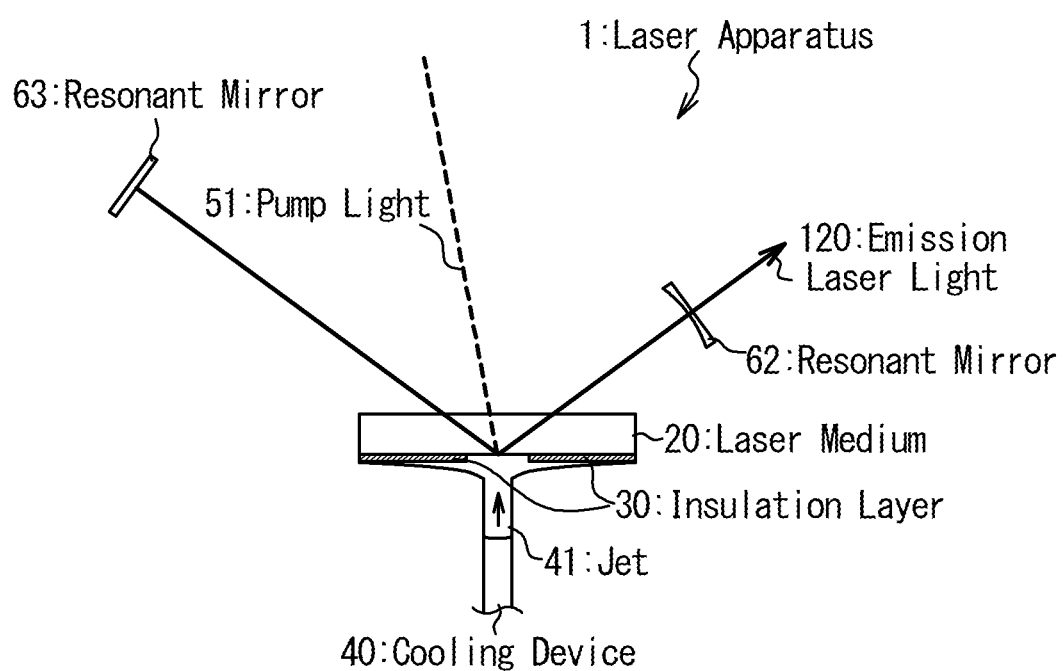
FIG. 8 is a diagram that shows a configuration example of a laser apparatus according to an embodiment.

A variation example of the laser apparatus 1 in FIG. 7 will be described with reference to FIG. 8. FIG. 8 is a diagram that shows a configuration example of a laser apparatus 1 according to an embodiment.

The laser apparatus 1 in FIG. 8 is equivalent to the laser apparatus 1 in FIG. 7 added with following modifications. That is, the dichroic mirror 61 is omitted and the optical axis of the pump light 51 is moved to a location similar to FIG. 1. The laser apparatus 1 in FIG. 8 can perform laser oscillation similarly to the case in FIG. 7.

Although the invention made by the inventor has been described above in detail based on embodiments, it is needless to say that the present invention is not limited to the above-described embodiments and various modifications can be made without departing from the gist thereof. In addition, each of features described in the above embodiments can be freely combined within a technically consistent range.

The present application claims priority based on the Japanese Patent Application No. 2019-33984 filed on Feb. 27, 2019, and incorporates herein all disclosure thereof.

The invention claimed is:

1. A laser apparatus comprising: a laser medium having a first surface on which incident laser light is incident and a second surface parallel to the first surface; an insulation layer; and a cooling device configured to cool the laser medium by directly injecting a jet to at least a first area of the second surface, wherein the second surface is configured to totally reflect, in the first area, the incident laser light that is incident to the second surface at an incident angle equal to or larger than a critical angle, wherein the insulation layer is configured to cover only a second area of the second surface that surrounds the first area of the second surface, so that the jet reaches at least a part of the insulation layer, and wherein the laser medium is exposed in the first area.

2. The laser apparatus according to claim 1, further comprising:
   an incident laser light generator configured to generate the incident laser light; and
   a pump light generator configured to generate pump light to be irradiated to the first area of the laser medium.

3. The laser apparatus according to claim 2, further comprising:
   an optical device configured to make the pump light be incident on the laser medium with a same optical axis as the incident laser light.

4. The laser apparatus according to claim 1,
   wherein a thickness of the insulation layer is equal to or more than a quarter of a wavelength of the incident laser light and equal to or less than twenty-one times the quarter of the wavelength.

5. The laser apparatus according to claim 1,
   wherein the insulation layer comprises a high reflective coating configured to increase a reflectance of the second area.

6. The laser apparatus according to claim 1,
   wherein the insulation layer comprises an anti-reflection coating configured to increase a transmittance of the second area.

7. A laser apparatus comprising: a laser medium having a first surface on which first light is incident and a second surface parallel to the first surface; an insulation layer; a cooling device configured to cool the laser medium by directly injecting a jet to at least a first area of the second surface; a first resonant mirror configured to reflect at least a portion of the first light that is totally reflected at the first area, toward the first area; and a second resonant mirror configured to reflect the first light, that is totally reflected at the first area, toward the first area with a reflectance higher than the first resonant mirror, wherein the second surface is configured to totally reflect, in the first area, the first light that is incident to the second surface at an incident angle equal to or larger than a critical angle, wherein the insulation layer is configured to cover only a second area of the second surface that surrounds the first area of the second surface, so that the jet reaches at least a part of the insulation layer, wherein the laser medium is exposed in the first area, and wherein the first resonant mirror and the second resonant mirror are configured to perform laser oscillation therebetween for a laser light emission.

8. The laser apparatus according to claim 7, further comprising:
   an optical device configured to make second light be incident on the laser medium with a same optical axis as the first light.

* * * * *